US012555706B2

(12) United States Patent
Tung et al.

(10) Patent No.: US 12,555,706 B2
(45) Date of Patent: Feb. 17, 2026

(54) OVER-CURRENT PROTECTION DEVICE

(71) Applicant: Polytronics Technology Corp., Hsinchu (TW)

(72) Inventors: Cheng-Yu Tung, Tainan (TW); Chen-Nan Liu, Pitou Township, Changhua County (TW); Chia-Yuan Lee, Hsinchu (TW); Hsiu-Che Yen, Taoyuan (TW); Yung-Hsien Chang, Douliu (TW); Yao-Te Chang, Linnei Township, Yunlin County (TW); Fu-Hua Chu, Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 357 days.

(21) Appl. No.: 18/185,283

(22) Filed: Mar. 16, 2023

(65) Prior Publication Data

US 2024/0145132 A1 May 2, 2024

(30) Foreign Application Priority Data

Oct. 28, 2022 (TW) ................................ 111141218

(51) Int. Cl.
*H01C 7/02* (2006.01)

(52) U.S. Cl.
CPC ............ *H01C 7/021* (2013.01); *H01C 7/028* (2013.01)

(58) Field of Classification Search
CPC ................................ H01C 7/021; H01C 7/028
See application file for complete search history.

(56) References Cited

U.S. PATENT DOCUMENTS

| | | | | | |
|---|---|---|---|---|---|
| 5,793,276 | A * | 8/1998 | Tosaka | H01C 1/1406 | 338/332 |
| 6,090,314 | A * | 7/2000 | Handa | H01C 7/027 | 252/514 |
| 6,143,206 | A * | 11/2000 | Handa | H01C 7/027 | 252/511 |
| 6,299,801 | B1 * | 10/2001 | Handa | H01C 7/027 | 219/547 |
| 6,558,579 | B2 * | 5/2003 | Handa | H01C 17/06586 | 219/547 |
| 6,778,062 | B2 * | 8/2004 | Handa | G01K 7/22 | 428/221 |
| 7,286,038 | B1 | 10/2007 | Wang et al. | | |
| 2002/0093007 | A1 * | 7/2002 | Handa | H01M 10/4235 | 252/500 |

(Continued)

FOREIGN PATENT DOCUMENTS

| | | | |
|---|---|---|---|
| CN | 100567383 | C | 12/2009 |
| CN | 109243667 | A | 1/2019 |

(Continued)

*Primary Examiner* — Kyung S Lee

(74) *Attorney, Agent, or Firm* — MUNCY, GEISSLER, OLDS & LOWE, P.C.

(57) ABSTRACT

An over-current protection device includes first and second electrode layers and a PTC material layer laminated therebetween. The PTC material layer includes a polymer matrix, and a conductive filler. The polymer matrix has a fluoropolymer. The total volume of the PTC material layer is calculated as 100%, and the fluoropolymer accounts for 47-62% by volume of the PTC material layer. The fluoropolymer has a melt viscosity higher than 3000 Pa·s.

13 Claims, 3 Drawing Sheets

(56) References Cited

U.S. PATENT DOCUMENTS

| | | | | |
|---|---|---|---|---|
| 2003/0091829 | A1* | 5/2003 | Handa | H01C 17/06513 428/416 |
| 2004/0041683 | A1* | 3/2004 | Tosaka | H01C 7/027 338/22 R |
| 2005/0001207 | A1 | 1/2005 | Park et al. | |
| 2006/0231807 | A1* | 10/2006 | Tosaka | C08K 3/08 252/500 |

FOREIGN PATENT DOCUMENTS

| | | | |
|---|---|---|---|
| CN | 114196144 | A | 3/2022 |
| CN | 115244631 | A | 10/2022 |
| TW | I766722 | B | 6/2022 |

* cited by examiner

OVER-CURRENT PROTECTION DEVICE

BACKGROUND OF THE INVENTION

(1) Field of the Invention

The present application relates to an over-current protection device, and more specifically, to a thermally stable over-current protection device having excellent electrical resistance characteristics and voltage endurance capability under high temperature.

(2) Description of the Related Art

Because the electrical resistance of conductive composite materials having a positive temperature coefficient (PTC) characteristic is very sensitive to temperature variation, they can be used as the materials for current sensing devices and have been widely applied to over-current protection devices or circuit devices. More specifically, the electrical resistance of the PTC conductive composite material remains extremely low at normal temperatures, so that the circuit or cell can operate normally. However, when an over-current or an over-temperature situation occurs in the circuit or cell, the electrical resistance will instantaneously increase to a high electrical resistance state (e.g., at least above $10^{-4}\Omega$), which is the so-called "trip". Therefore, the over-current will be eliminated so as to protect the cell or the circuit device.

The basic structure of the over-current protection device consists of a PTC material layer with two electrodes bonded to two opposite sides of the PTC material layer. The PTC material layer includes a polymer matrix and a conductive filler dispersed in the polymer matrix. The over-current protection device generally uses high density polyethylene (HDPE) as its polymer matrix, and uses an electrically conductive ceramic material as its conductive filler. Recently, a fluoropolymer (e.g., polyvinylidene difluoride) may be used as part of or the entire polymer matrix because of its stability at high temperature condition. However, besides the polymer matrix and the conductive filler, additional additives are conventionally needed to ensure electrical resistance stability of the over-current protection device at high temperature condition. The additional additives usually make the formulation design complicated. For example, compatibility between the additional additives, polymers, and the conductive filler must be taken into consideration; after considering the compatibility and deciding desirable additives, the proportion between the polymers and the conductive filler needs to be adjusted properly in order to maintain excellent electric characteristics. In the time of fast-changing technologies, the formulation is frequently improved on the prior basis. However, the more compounds the formulation has, the more complex the formulation design is. It is favorable to design the formulation with less variables.

Additionally, electronic apparatuses are being made smaller and smaller as time goes on. Therefore, it is required to extremely restrict the sizes or thicknesses of active and passive devices. However, if the top-view area of the PTC material layer is decreased, the electrical resistance of the device will be increased, and the voltage which the device can endure at most is lowered. Thus, the over-current protection device cannot withstand large current and high power. In addition, if the thickness of the PTC material layer is reduced, the voltage endurance capability of the device will be reduced at the same time. Apparently, small-sized over-current protection devices are easily burnt out in real applications.

Accordingly, there is a need to improve electrical resistance stability and voltage endurance capability of the over-current protection device at high temperature.

SUMMARY OF THE INVENTION

The present invention provides a small-sized over-current protection device which can be applied at high temperature. The present invention selects a fluoropolymer with high melting point as the major constituent of its polymer matrix, and further adjusts the melt viscosity of the fluoropolymer in the range from about 3000 Pa·s to 5300 Pa·s, by which the over-current protection device may have and stably maintain higher electrical resistance at high temperature. After tripping many times under high temperature, the over-current protection device can recover back to low electrical resistance state. In addition, the adjustment of melt viscosity can also enhance voltage endurance capability of the over-current protection device. In this way, thermal stability and voltage endurance capability of the over-current protection device can be improved without help of additional additives.

In accordance with an aspect of the present invention, an over-current protection device includes a first electrode layer, a second electrode layer, and a positive temperature coefficient (PTC) material layer. The PTC material layer is laminated between the first electrode layer and the second electrode layer. The PTC material layer includes a polymer matrix and a conductive filler. The polymer matrix includes a first fluoropolymer. The total volume of the PTC material layer is calculated as 100%, and the first fluoropolymer accounts for 47% to 62% by volume of the PTC material layer, and the first fluoropolymer has a melt viscosity higher than 3000 Pa·s. The conductive filler is dispersed in the polymer matrix, thereby forming an electrically conductive path in the PTC material layer.

In an embodiment, the first fluoropolymer has the melt viscosity ranging from 3000 Pa·s to 5300 Pa·s at 240° C. and at a shear rate of 50 $sec^{-1}$.

In an embodiment, the first fluoropolymer is polyvinylidene difluoride (PVDF).

In an embodiment, the first fluoropolymer is selected from the group consisting of a first PVDF, a second PVDF, and a combination thereof, wherein the first PVDF has a first melt viscosity and the second PVDF has a second melt viscosity, and the second melt viscosity is higher than the first melt viscosity.

In an embodiment, the first melt viscosity ranges from 3000 Pa·s to 3600 Pa·s, and the second melt viscosity ranges from 4700 Pa·s to 5300 Pa·s.

In an embodiment, the polymer matrix further includes a second fluoropolymer selected from the group consisting of polytetrafluoroethylene (PTFE), ethylene-tetrafluoroethylene copolymer, tetrafluoroethylene-hexafluoro-propylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof.

In an embodiment, the second fluoropolymer is PTFE, wherein the total volume of the PTC material layer is calculated as 100%, and PTFE accounts for 4.0% to 4.9% by volume of the PTC material layer.

In an embodiment, the PTC material layer does not include a plasticizer and a cross-linking agent.

In an embodiment, the conductive filler is carbon black.

In an embodiment, the polymer matrix consists of PVDF and PTFE, wherein the volume of the polymer matrix is calculated as 100%, and PVDF accounts for 91% to 94% and PTFE accounts for 6% to 9% by volume of the polymer matrix.

In an embodiment, the first fluoropolymer has a melt flow index ranging from 0.5 g/10 min to 4.3 g/10 min at 230° C.

In an embodiment, a mixture is formed of the polymer matrix and the conductive filler during a blending operation, and the mixture has a blending viscosity so that a blender performs the blending operation with a torque ranging from 27 N·m to 29 N·m.

In an embodiment, the over-current protection device has a first electrical resistance when cooled back to room temperature after a first trip event, and the over-current protection device has a second electrical resistance when cooled back to room temperature after a second trip event, wherein a value by dividing the second electrical resistance by the first electrical resistance ranges from 0.9 to 1.3.

In an embodiment, the over-current protection device has the second electrical resistance when cooled back to room temperature after baking at 175° C. for 4 hours, and the value ranges from 0.99 to 1.17.

In an embodiment, the over-current protection device has the second electrical resistance when cooled back to room temperature after baking at 175° C. for 10 hours, and the value ranges from 0.90 to 1.20.

In an embodiment, the over-current protection device has a third electrical resistance at 170° C., and has a fourth electrical resistance at 200° C., wherein a value by dividing the fourth electrical resistance by the third electrical resistance ranges from 0.75 to 1.79.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
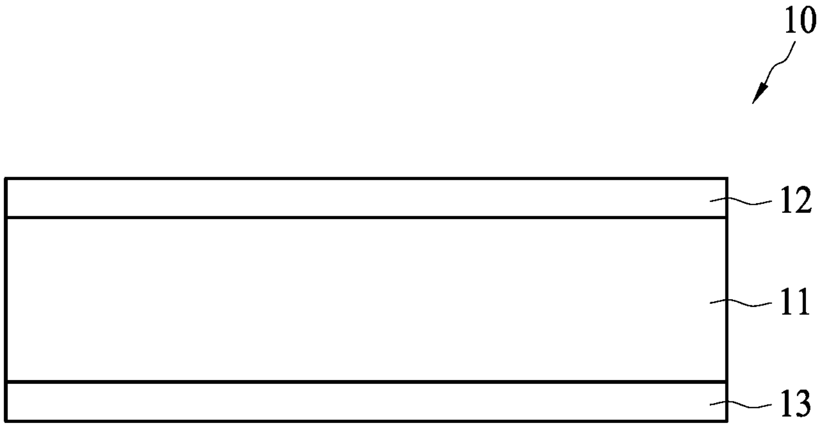
FIG. 1 shows a cross-sectional view of an over-current protection device in accordance with an embodiment of the present invention.

Please refer to FIG. 1. FIG. 1 shows one basic aspect of an over-current protection device 10 of the present invention in cross-sectional view. The over-current protection device 10 includes a first electrode layer 12, a second electrode layer 13, and a positive temperature coefficient (PTC) material layer 11 laminated between the first electrode layer 12 and the second electrode layer 13. In an embodiment, the first electrode layer 12 and the second electrode layer 13 may be composed of the nickel-plated copper foils or other conductive metals. The PTC material layer 11 includes a polymer matrix and a conductive filler.

In the PTC material layer 11, the polymer matrix includes at least one fluoropolymer as its major constituent, and the conductive filler is dispersed in the polymer matrix, thereby forming an electrically conductive path in the PTC material layer 11. In addition, the fluoropolymer may exhibit different melt viscosities by adjusting molecular weight, degree of cross-linking, or other methods based on the properties of the fluoropolymer itself. The present invention adjusts and has the melt viscosity of the fluoropolymer higher than 3000 Pa·s, which is favorable to the stability of physical and chemical properties at high temperature including but not limited to stable electrical resistance, stable device structure, or even other unexpectedly advantageous properties. Moreover, the total volume of the PTC material layer is calculated as 100%, and the above fluoropolymer with a specific melt viscosity (referred to “first fluoropolymer” hereinafter) accounts for 47% to 62% by volume of the PTC material layer.

More specifically, the first fluoropolymer is tested in accordance with the standard of ASTM D3835, and has the melt viscosity ranging from 3000 Pa·s to 5300 Pa·s at 240° C. and at a shear rate of 50 $sec^{-1}$. If the melt viscosity is lower than 3000 Pa·s, the high electrical resistance that the over-current protection device 10 can reach is relatively low at the time of tripping. Also, after tripping, the high electrical resistance gradually decreases with gradual elevation of temperature, and such situation may be referred to as negative coefficient temperature (NTC) behavior. The overcurrent cannot be properly cut off due to the issue of NTC behavior, and thus the over-current protection device may not appropriately protect the circuit from damage. If the melt viscosity is higher than 5300 Pa·s, it is difficult to blend the polymer matrix with the conductive filler, thereby causing inconvenience during the manufacturing process. The higher the melt viscosity is, the poorer the flowability is under high temperature. The issue of high melt viscosity makes the material difficult to flow in a homogeneous way, and the resistance to blending and difficulty of molding are increased.

The first fluoropolymer is also tested in accordance with the standard of ASTM D1238, and the first fluoropolymer has a melt flow index ranging from 0.5 g/10 min to 4.3 g/10 min at 230° C. The melt flow index can be an index for assessing the flowability of a melting material. The lower the melt flow index is, the poorer the flowability is. If the melt flow index is lower than 0.5 g/10 min, the issue of the aforementioned inconvenience during the manufacturing process arises. If the melt flow index is higher than 4.3 g/10 min, the issue of the aforementioned NTC behavior arises.

The present invention also observes the rotation force (torque) of a blender during the process. Regarding the blender, the rotation force during a blending operation shows processability of the material. More specifically, the polymer matrix and the conductive filler together form a mixture during the blending operation, and a blending viscosity of the mixture is substantially determined by the melt viscosity of the first fluoropolymer. When the melt viscosity ranges from 3000 Pa·s to 5300 Pa·s, the blender performs the blending operation well with a torque ranging from 27 N·m to 29 N·m. However, if the melt viscosity is higher than 5300 Pa·s, the blender needs higher torque (above 29 N·m.) to properly perform the blending operation, disadvantageously increasing difficulty in the process.

In the present invention, the first fluoropolymer is polyvinylidene difluoride (PVDF). PVDF may be selectively modified in physical/chemical properties itself so as to obtain a plurality of PVDF with different melt viscosities but having the same melting point. For example, in terms of the adjustment of molecular weight of polymer, VDF monomers can be polymerized to yield PVDF with a first melt viscosity ranging from 3000 Pa·s to 3600 Pa·s (referred to as "first PVDF" hereinafter). In other case, VDF monomers can be polymerized to yield PVDF with a second melt viscosity ranging from 4700 Pa·s to 5300 Pa·s (referred to as "second PVDF" hereinafter). Either the first PVDF or the second PVDF can be used in the present invention. The over-current protection device 10 may exhibit excellent thermal stability as long as the melt viscosity is in the range from 3000 Pa·s to 5300 Pa·s. In an embodiment, the melt viscosity of PVDF may be 3000 Pa·s, 3200 Pa·s, 3300 Pa s, 3600 Pa·s, 3900 Pa·s, 4200 Pa·s, 4500 Pa·s, 4800 Pa·s, 5000 Pa·s, 5100 Pa·s, or 5300 Pa·s. Under some circumstances, two or more PVDF with different melt viscosities can be mixed together, such as mixing the first PVDF with the second PVDF. Accordingly, in an embodiment, the first fluoropolymer is selected from the group consisting of the first PVDF, the second PVDF, and a combination thereof.

Moreover, the polymer matrix may further include another fluoropolymer (referred to as "second fluoropolymer" hereinafter) different from the first fluoropolymer made of PVDF. That is, the second fluoropolymer is made of any fluoropolymer except PVDF. In an embodiment, the second fluoropolymer is selected from the group consisting of polytetrafluoroethylene (PTFE), ethylene-tetrafluoroethylene copolymer, tetrafluoroethylene-hexafluoro-propylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof. In the present invention, the second fluoropolymer is PTFE, and is included in the polymer matrix as its minor constituent. Therefore, the total volume of the PTC material layer 11 is calculated as 100%, and PTFE accounts for 4.0% to 4.9% by volume of the PTC material layer 11. Besides, the melting point of PTFE is higher than that of PVDF, by which PTFE can be used to fine-tune the thermal stability of the polymer matrix. For such purpose, the amount of PTFE relative to PVDF needs to be carefully controlled in a certain range. In an embodiment, the polymer matrix consists of PVDF and PTFE, wherein the volume of the polymer matrix is calculated as 100%, and PVDF accounts for 91% to 94% and PTFE accounts for 6% to 9% by volume of the polymer matrix.

It is noted that other fluoropolymers with different melting points may be used as the major constituent of the polymer matrix in the over-current protection device 10 when it comes to different protection temperatures. For example, if the apparatus to be protected is likely to be burnt out at a temperature higher than 200° C., PVDF with its melting point around 170° C.-178° C. may be selected to be the major constituent of the polymer matrix. If the apparatus to be protected is likely to be burnt out at a temperature higher than 280° C., ethylene-tetrafluoroethylene copolymer (ETFE) with its melting point around 220° C.-260° C. may be selected to be the major constituent of the polymer matrix. From the above, the over-current protection device 10 may be applied to the apparatuses with different desired protection temperatures, because the over-current protection device 10 can be modified and tripped at different temperatures. Also, the high electrical resistance state of the over-current protection device 10 is stable after tripping, and thus its thermal stability is excellent.

In addition, the PTC material layer 11 does not include any plasticizer and cross-linking agent. More specifically, the PTC material layer 11 does not include any plasticizer, cross-linking agent, or other additives for adjusting viscosity. Except for the polymer matrix and the conductive filler, additional additives are conventionally needed to ensure the thermal stability of the over-current protection device 10. For example, the plasticizer may be used to increase flexibility and flowability of the polymer matrix. The plasticizer can decrease the melt viscosity of the entire polymer matrix if the melt viscosity of the selected fluoropolymer is too high. As for cross-linking agent, it may increase the degree of cross-linking in the fluoropolymer, and increase the melt viscosity of the fluoropolymer in the meantime. The cross-linking agent can increase the melt viscosity of the entire polymer matrix if the melt viscosity of the selected fluoropolymer is too low. However, different additional additives have different physical/chemical properties. Compatibility and suitable proportion between the additional additives, polymers, and the conductive filler must be taken into consideration. For example, during the process of blending the plasticizer with the fluoropolymer, the plasticizer may reside in the amorphous region of the fluoropolymer and interact with its polymer chains, thereby reducing polar bonds of the fluoropolymer. According to the interaction above, the plasticizer may increase non-crystallinity of the fluoropolymer so that the thermal stability is changed or even other unexpected results in electrical characteristics arise. In another situation, triallyl isocyanurate (TAIC) or the like is commonly used as the cross-linking agent. However, TAIC makes the high electrical resistance state unstable after tripping of device. The resulted curves in the resistance-temperature (R-T) test would show lots of undesired waves, and the voltage endurance capability of the over-current protection device 10 is poor. Nevertheless, adoption of the additional additives leads to complexity in terms of formulation design.

As for the conductive filler, it is made of carbon black in the present invention. But, according to the present invention, the conductive filler does not include tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, or the like. Although it is known that the above materials (especially tungsten carbide), compared to carbon black, serving as the conductive filler are helpful to lower electrical resistance of the over-current protection device 10, they give the over-current protection device 10 poor voltage endurance capability. If such conductive filler having poor voltage endurance capability combines with the first fluoropolymer, the over-current protection device 10 cannot pass cycle life test.

In the experiment for testing thermal stability under high temperature, the over-current protection device 10 has a first electrical resistance when cooled back to room temperature after a first trip event, and the over-current protection device 10 has a second electrical resistance when cooled back to room temperature after a second trip event. A value by dividing the second electrical resistance by the first electrical resistance ranges from 0.9 to 1.3. More specifically, the over-current protection device 10 may experience several processes or operations (e.g., additional processing, assembly to circuit board, or during operation of the apparatus to be protected) under high temperature environment, and the high temperature from these processes or operations makes the over-current protection device 10 tripped and switch to the high electrical resistance state. After the over-current protection device 10 cools back to room temperature, its low electrical resistance can be recovered. Given the thermal stability provided by the first fluoropolymer, the over-current protection device 10 may have excellent resistance recovery capability. Taking two thermal treatments as an example, the over-current protection device 10 is subject to the first thermal treatment during assembly, and then the second thermal treatment during baking. When the over-current protection device 10 is welded to the substrate (not shown), the high temperature heat from welding makes the over-current protection device 10 tripped and switch to the high electrical resistance state. The first electrical resistance can be measured after the over-current protection device 10 cools back to room temperature and remains in the low electrical resistance state. Then, the over-current protection device 10 is baked at 175° C. for 4 hours, and the high temperature from baking makes the over-current protection device 10 tripped again and switch to the high electrical resistance state. The second electrical resistance can be measured after the over-current protection device 10 cools back to room temperature and remains in the low electrical resistance state. The value by dividing the second electrical resistance by the first electrical resistance may range from 0.99 to 1.17. In another embodiment, the over-current protection device 10 is baked at 175° C. for 10 hours, and the high temperature from baking makes the over-current protection device 10 tripped and switch to the high electrical resistance state. The second electrical resistance can be measured after the over-current protection device 10 cools back to room temperature and remains in the low electrical resistance state. In the above embodiment of 10 hours of baking, the value by dividing the second electrical resistance by the first electrical resistance may range from 0.90 to 1.20. From the above, the ratio of the second electrical resistance divided by the first electrical resistance is close to 1 in either case of 4 hours/10 hours of baking. The over-current protection device 10 has excellent resistance recovery capability from high electrical resistance state, and its resistance recovery capability is less susceptible to high temperature, thereby having a great thermal stability.

Figure 2:
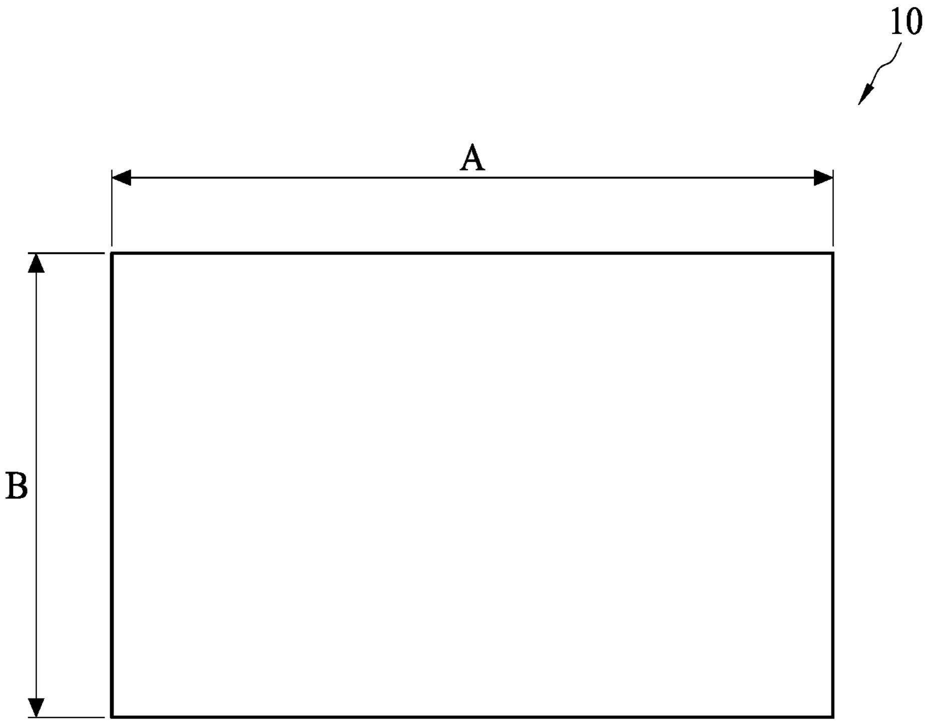
FIG. 2 shows the top view of the over-current protection device shown in FIG. 1.

Please refer to FIG. 2, it shows the top view of the over-current protection device 10 shown in FIG. 1. The over-current protection device 10 has a length A and a width B, and the top-view area "A×B" of the over-current protection device 10 is substantially equivalent to the top-view area of the PTC material layer 11. The PTC material layer 11 may have a top-view area ranging from 4 $mm^2$ to 72 $mm^2$ based on different products having different sizes. For example, the top-view area "A×B" may be 2×2 $mm^2$, 5×5 $mm^2$, 5.1×6.1 $mm^2$, 5×7 $mm^2$, 7.62×7.62 $mm^2$, 8.2×7.15 $mm^2$, or 7.62×9.35 $mm^2$.

Figure 3:
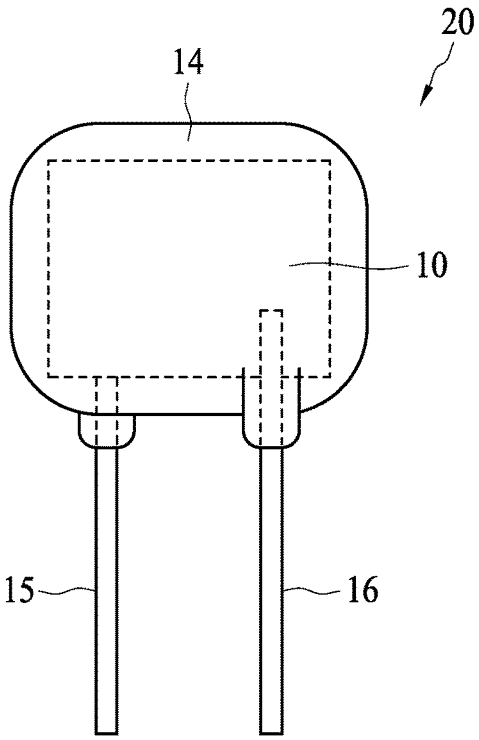
FIG. 3 shows a radial-leaded over-current protection device in accordance with an embodiment of the present invention.
Figure 4:
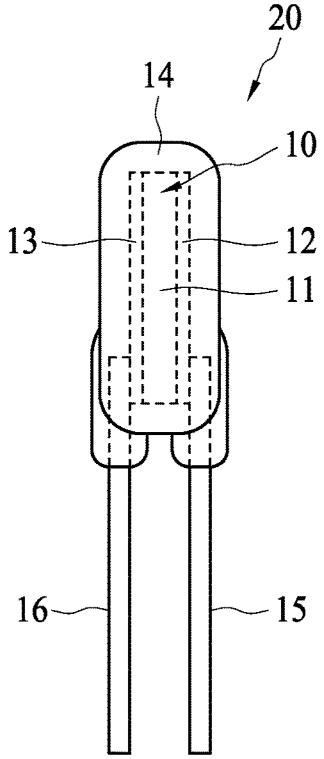
FIG. 4 shows a side view of the radial-leaded over-current protection device in FIG. 3.

Please refer to FIG. 3 and FIG. 4, the over-current protection device 10 may be processed to form other device types. A solder paste is coated on the outer surfaces of the first and second electrode layers 12 and 13, and two copper electrodes with a thickness of 0.5 mm are respectively disposed on the solder paste on the first and second electrode layers 12 and 13 as external leads 15 and 16, and then the assembled device is subjected to a reflow soldering process at 300° C. so as to form an over-current protection device 20 of a radial-leaded device (RLD) type. An insulation cover layer 14, such as an epoxy layer or other encapsulation layers, may be further formed on an entire outer surface of the device to avoid water and oxygen entering the device 20, wherein water and oxygen inside the device 20 may deteriorate electrical properties of the device 20.

In order to verify the technical effects in respect of thermal stability after processing of the device, the present invention performs R-T test (will be described in detail in the following context) on the over-current protection device 20. R-T test is performed with a heating rate of 10° C./min and a holding time of 15 mins/5° C., and the resistance-temperature curves of the over-current protection device 20 can be obtained. A third electrical resistance is measured at 170° C., and a fourth electrical resistance is measured at 200° C. A value by dividing the fourth electrical resistance by the third electrical resistance ranges from 0.75 to 1.79. After tripping, the aforementioned value can maintain at 1 or even up to 1.79 with gradual elevation of temperature. In other words, the over-current protection device made by the present disclosure has not only excellent resistance recovery capability (as discussed in FIG. 1), but also a stable high electrical resistance state after tripping under high temperature. In an embodiment, the value by dividing the fourth electrical resistance by the third electrical resistance may be 0.75, 1, 1.3, 1.58, or 1.79. Although the above tested device is the device of RLD type, it is understood that the over-current protection device 20 may be the device of an axial-leaded device (ALD) type, or other device types depending on the requirements.

As described above, the present invention improves the electrical resistance characteristics, and enhances the voltage endurance capability of the over-current protection device in the meantime. It could be verified according to the experimental data in Table 1 to Table 7 as shown below.

TABLE 1

Volume percentage (vol %) of the PTC material layer 11.

| Group | PVDF-1 | PVDF-2 | PVDF-3 | PTFE | HDPE | $Mg(OH)_2$ | CB |
|---|---|---|---|---|---|---|---|
| E1 | 59 | | | 4.2 | | 3.2 | 33.6 |
| E2 | | 50 | | 4.7 | | 3.2 | 42.1 |
| C1 | | | 57.1 | 4.7 | | 3.2 | 35.0 |
| C2 | | | | | 60 | 15.5 | 24.5 |

TABLE 2

Melt viscosity and melt flow index of the fluoropolymer.

| Polymer | Melt viscosity (Pa · s) | Melt flow index (g/10 min) |
|---|---|---|
| PVDF-1 | 5100 | 1.1 |
| PVDF-2 | 3200 | 3 |
| PVDF-3 | 2300 | 1.9 |

Table 1 shows the composition to form the PTC material layer 11 by volume percentages in accordance with the embodiments (E1-E2) of the present disclosure and the comparative examples (C1-C2). The first column in Table 1 shows test groups E1-C2 from top to bottom. The first row in Table 1 shows various materials used for the PTC material layer 11 from left to right, that is, polyvinylidene difluoride (PVDF), polytetrafluoroethylene (PTFE), high-density polyethylene (HDPE), magnesium hydroxide ($Mg(OH)_2$), and carbon black (CB). It is noted that there are three different types of PVDF in the experiment, each of which has different melt viscosity and melt flow index. As shown in Table 2, the melt viscosity and melt flow index of the first PVDF (PVDF-1) are 5100 Pa·s and 1.1 g/10 min, respectively. The melt viscosity and melt flow index of the second PVDF (PVDF-2) are 3200 Pa·s and 3 g/10 min, respectively. The melt viscosity and melt flow index of the third PVDF (PVDF-3) are 2300 Pa·s and 1.9 g/10 min, respectively. The melt viscosity is measured at 240° C. and at a shear rate of 50 sec' in accordance with the standard of ASTM D3835. The melt flow index is measured at 230° C. in accordance with the standard of ASTM D1238. In addition, each group uses magnesium hydroxide ($Mg(OH)_2$) as its inner filler. Magnesium hydroxide ($Mg(OH)_2$) functions as a flame retardant and can react with hydrofluoric acid (HF) produced from degradation of fluoropolymer. In order to enhance voltage endurance capability and stabilize other electrical properties, it is noted that the present invention only uses carbon black (CB) as the conductive filler, and thus the metal-containing materials described above are not taken into consideration.

In the embodiment E1 and embodiment E2, the major constituent of the polymer matrix is PVDF, and the minor constituent of the polymer matrix is PTFE. The melting point of PTFE is about 330° C., which is much higher than PVDF, and therefore the proportion of PTFE should not be excessively high. Otherwise, undesired high melt viscosity, high melting point, and other unexpected issues will arise. The proportion of PTFE relative to PVDF needs to be carefully controlled. More specifically, the proportion between PVDF and PTFE is in the range from 91:9 to 94:6. That is, the total volume of PVDF and PTFE is calculated as 100%, and PVDF accounts for 91% to 94% and PTFE accounts for 6% to 9%. Accordingly, in the embodiment E1, PVDF-1 accounts for 59% and PTFE correspondingly accounts for 4.2% by volume of the PTC material layer 11; and in the embodiment E2, PVDF-2 accounts for 50% and PTFE correspondingly accounts for 4.7% by volume of the PTC material layer 11.

In the comparative example C1, the polymer matrix is made of PVDF and PTFE, the same as in the embodiments E1-E2. However, the comparative example C1 has a different type of PVDF, i.e. PVDF-3. PVDF-3 in the comparative example C1 has a lower melt viscosity and medium melt flow index, and is often used in the conventional over-current protection device. It is noted that melt viscosity and melt flow index are measured based on different standards, and these two different parameters may not have positive correlation therebetween. In the experiment, the inventors found that it is preferred to use melt viscosity as basis for adjustment in the system of such polymer/conductive filler. Accordingly, PVDF-3 has a better flowability than PVDF-1 and PVDF2, by which the experiment can compare the difference between conventional PVDF with low melt viscosity and PVDF with high melt viscosity of the present invention.

In the comparative example C2, the polymer matrix is made of HDPE, which is different from the polymer used in the embodiments E1-E2. Therefore, the comparative example C2 and the embodiments E1-E2 are used to compare the difference between two polymer systems. The melting point of HDPE is much lower than that of PVDF, and thus HDPE is used in the apparatus to be protected at low temperature.

According to the composition shown in Table 1, the manufacturing process of the over-current protection device is described below. The embodiments E1-E2 and comparative examples C1-C2 are all manufactured by the same method. First, materials of the test groups are formulated to the compositions with corresponding specific volume percentages (i.e., the percentages of embodiments and comparative examples as shown in Table 1), and the formulated materials are put into HAAKE™ twin screw blender for blending. The blending temperature is 215° C., the time for pre-mixing is 3 minutes, and the blending time is 15 minutes.

It is noted that since the polymer matrix and the conductive filler account for the major part of the PTC material layer 11 (at least 80%, or even 90% by volume), the rotation force for blending is substantially determined by the mixture of the polymer matrix and the conductive filler. Consequently, each of the mixtures possesses a blending viscosity, and the blender needs a corresponding torque for blending.

TABLE 3

Needed torque during blending.

| Group | Torque (N · m) |
|---|---|
| E1 | 29 |
| E2 | 27 |
| C1 | 22 |
| C2 | 17 |

As shown in Table 3, when the melt viscosity of PVDF ranges from 3000 Pa·s to 5300 Pa·s, the blender performs the blending operation with a torque ranging from 27 N·m to 29 N·m. However, if the melt viscosity is higher than 5300 Pa·s, the needed torque for blending exceeds 29 N·m. It is difficult to uniformly blend the conductive filler with PVDF, thereby causing inconvenience during the manufacturing process.

Next, the conductive polymer after being blended is pressed into a sheet by a hot press machine at a temperature of 210° C. and a pressure of 150 $kg/cm^2$. The sheet is then cut into pieces of about 20 cm×20 cm, and two nickel-plated copper foils are laminated to two sides of the sheet with the hot press machine at a temperature of 210° C. and a pressure of 150 $kg/cm^2$, by which a three-layered structure is formed. Then, the sheet with the nickel-plated copper foils is punched into PTC chips, each of which is the over-current protection device of the present invention. The PTC chips to be tested has a length of 2 mm and a width of 2 mm, which means it has a top-view area of 4 $mm^2$, and additionally, it has a thickness of 0.22 mm. It is understood that the size of chip to be tested is intended to be illustrative only and is not limited in the present invention. The present invention may be applied to other PTC chips with different sizes, such as 2×2 $mm^2$, 5×5 $mm^2$, 5.1×6.1 $mm^2$, 5×7 $mm^2$, 7.62×7.62 $mm^2$, 8.2×7.15 $mm^2$, 7.62×9.35 $mm^2$, or any common size of the art. As for the thickness, the present invention may be applied to a thin-type over-current protection device, and the thickness may range from 0.20 mm to 0.25 mm depending on the requirements.

Then, the PTC chips of the embodiments E1-E2 and comparative examples C1-C2 are subjected to electron beam irradiation of 300 kGy (irradiation dose can be adjusted depending on the requirement). After irradiation, the following measurements are performed by taking five PTC chips as samples for each of E1-E2 and C1-C2.

In practical manufacturing process, the PTC chips may experience several processes under high temperature environment. Therefore, two baking treatments with different duration of baking time are performed to simulate the high temperature environment of molding, as shown in Table 4 and Table 5 below. Changes in electrical resistance between the baking treatments can be observed.

TABLE 4

| Baking treatment for 4 hours. | | | | | | | |
|---|---|---|---|---|---|---|---|
| Group | $R_i$ (Ω) | ρ_$R_i$ (Ω · cm) | $R_1$ (Ω) | ρ_$R_1$ (Ω · cm) | $R_{175^\circ C.}$_4 hr (Ω) | ρ_$R_{175^\circ C.}$_4 hr (Ω · cm) | $R_{175^\circ C.}$_4 hr/$R_1$ |
| E1 | 0.4142 | 0.75 | 0.8175 | 1.49 | 0.806 | 1.47 | 0.986 |
| E2 | 0.2742 | 0.50 | 0.7165 | 1.30 | 0.841 | 1.53 | 1.174 |
| C1 | 0.4761 | 0.87 | 3.281 | 5.97 | 6.542 | 11.89 | 1.994 |
| C2 | 0.821 | 1.49 | 1.455 | 2.65 | 3.205 | 5.83 | 2.203 |

In Table 4, the first row shows items to be tested from left to right.

"$R_i$" refers to initial electrical resistance of the PTC chip at room temperature.

"$R_1$" refers to the electrical resistance in respect of the first time that the PTC chip is tripped and cooled back to room temperature. More specifically, the PTC chip is assembled on the substrate by a reflow soldering process, and high temperature from the reflow soldering process causes trip of the PTC chip.

"$R_{175^\circ C.}$_4hr" refers to the electrical resistance of the assembled PTC chip when it is cooled back to room temperature after baking at 175° C. for 4 hours. The high temperature of 175° C. is close to the melting point of PVDF, and therefore the baking treatment with 4 hours can cause trip of the PTC chip for the second time.

Moreover, the electrical resistance formula is $p=R\times A/L$. "R" is electrical resistance, "L" is length (thickness), and "A" is cross sectional area. Accordingly, the electrical resistivity of Σ_$R_i$, ρ_$R_1$, and ρ_$R_{175^\circ C.}$_4hr can be calculated corresponding to $R_i$, $R_1$, and $R_{175^\circ C.}$_4hr.

"$R_{175^\circ C.}$_4hr/$R_1$" refers to the ratio between $R_{175^\circ C.}$_4hr and $R_1$. The smaller the ratio is, the better the electrical resistance recovery capability of the PTC chip will be. This ratio can be an index for assessing whether the PTC chip recovers to its low electrical resistance state under room temperature.

It is noted that the embodiment E1, the embodiment E2, and the comparative example C1 are PVDF-based polymer matrix, and the stability of electrical resistance under the same polymer system (but with different types of PVDF) can be analyzed. In Table 4, PVDF in either the embodiment E1 or the embodiment E2 has higher melt viscosity, and after the first trip event, $R_1$ of the embodiment E1 and $R_1$ of the embodiment E2 are 0.8175Ω and 0.7165Ω, respectively, about 2 to 2.6 times their initial After the second trip event, $R_{175^\circ C.}$_4hr of the embodiment E1 and $R_{175^\circ C.}$_4hr of the embodiment E2 are 0.806Ω and 0.841Ω, respectively, and the corresponding ratio between $R_{175^\circ C.}$_4hr and $R_1$ ($R_{175^\circ C.}$_4hr/$R_1$) only ranges from 0.986 to 1.174. It shows that the PTC chip can recover to its initial low electrical resistance state (or even lower) under room temperature after two trip events. In comparison, after the first trip event, $R_1$ of the comparative example C1 is 3.281Ω, about 6.9 times the initial which is much larger than that (2 to 2.6 times) in the embodiments E1-E2. After the second trip event, $R_{175^\circ C.}$_4hr of the comparative example C1 is 6.542Ω, and the ratio between $R_{175^\circ C.}$_4hr and $R_1$ ($R_{175^\circ C.}$_4hr/$R_1$) is 1.99. The value of $R_{175^\circ C.}$_4hr is almost twice the value of $R_1$. That is, in the comparative example C1, its electrical resistance jumps to about 6.9 times the initial electrical resistance after the first trip event, and then jumps to about 2 times the previous electrical resistance (i.e., $R_1$) after the second trip event. It is clear that the stability of electrical resistance of the comparative example C1 is very sensitive to high temperature, and therefore the electrical resistance of it is difficult to get back to the initial low electrical resistance state even when cooled back to room temperature.

As for the embodiments E1-E2 and the comparative example C2, they are based on different polymer systems, and the stability of electrical resistance under the different polymer systems can be analyzed. After the first trip event, $R_1$ of the comparative example C2 is 1.455Ω, about 1.8 times the initial electrical resistance After the second trip event, $R_{175^\circ C.}$_4hr of the comparative example C2 is 3.205Ω, and the ratio between $R_{175^\circ C.}$_4hr and $R_1$ ($R_{175^\circ C.}$_4hr/$R_1$) is 2.203. The value of $R_{175^\circ C.}$_4hr is twice over the value of $R_1$. From the above, although the comparative example C2 has similar resistance recovery capability to the embodiments E1-E2 after the first trip event, the electrical resistance of the comparative example C2 jumps to above 2 times the previous electrical resistance (i.e., $R_1$) after the second trip event. Moreover, it is noted that the initial electrical resistance $R_i$ of the comparative example C2 is 0.821, which is much higher than that of the embodiments E1-E2; and the polymer matrix of the comparative example C2 consists of HDPE, the melting point of which is much lower than PVDF, and thus the comparative example C2 is not suitable for apparatuses requiring high protection temperature.

TABLE 5

| Baking treatment for 10 hours. | | | | | | | |
|---|---|---|---|---|---|---|---|
| Group | $R_i$ (Ω) | ρ_$R_i$ (Ω · cm) | $R_1$ (Ω) | ρ_$R_1$ (Ω · cm) | $R_{175^\circ C.}$_10 hr (Ω) | ρ_$R_{175^\circ C.}$_10 hr (Ω · cm) | $R_{175^\circ C.}$_10 hr/$R_1$ |
| E1 | 0.4142 | 0.75 | 0.8175 | 1.49 | 0.737 | 1.34 | 0.902 |
| E2 | 0.2742 | 0.50 | 0.7165 | 1.30 | 0.863 | 1.57 | 1.204 |
| C1 | 0.4761 | 0.87 | 3.281 | 5.97 | 7.700 | 14.00 | 2.347 |
| C2 | 0.821 | 1.49 | 1.455 | 2.65 | 8.933 | 16.24 | 6.140 |

Table 5 is similar to Table 4, and the only difference is baking time. Therefore, $R_i$, ρ_$R_i$, $R_1$, and ρ_$R_1$ in Table 5 are the same as that in Table 4, and are not described in detail herein. In the experiment, trip time of the second trip event is extended, and the inventors found that performance on the thermal stability is more pronounced in accordance with the embodiments E1-E2. Regarding the electrical resistance change between two trip events, $R_{175^\circ C.}$_10hr/$R_1$ of the embodiments E1-E2 remains around 1, that is, 0.902 to 1.204. However, $R_{175^\circ C.}$_10hr/$R_1$ of the comparative examples C1-C2 ranges from 2.347 to 6.140. In other words, the embodiments E1-E2 still remain excellent thermal stability so that their electrical resistance change is quite small after cooling back to room temperature, even though the baking time is extended. In comparison, the electrical resistance of the comparative examples C1-C2 jumps to at least twice or even up to 6 times the previous electrical resistance (i.e., $R_1$). As described above, the stability of electrical resistance of the embodiments E1-E2 is less sensitive to high temperature, and therefore both the embodiment E1 and the embodiment E2 have excellent electrical resistance recovery capability.

Next, the present invention further verifies the thermal stability of another type of the over-current protection device. As described in FIG. 3 and FIG. 4, the PTC chip can be processed to form the RLD-type over-current protection device (referred to as "RLD device" for simplification hereinafter). The electrical resistance of RLD device in each group is measured in the environment with gradual elevation of temperature. Under this environment, a heating rate of 10° C./min and a holding time of 15 mins/5° C. are provided.

TABLE 6

| Resistance-temperature (R-T) test. | | | | | | |
|---|---|---|---|---|---|---|
| Group | $R_i$ (Ω) | $R_{RLD}$ (Ω) | ρ_$R_{RLD}$ (Ω · cm) | $R_{170^\circ C.}$ (Ω) | $R_{200^\circ C.}$ (Ω) | $R_{200^\circ C.}/R_{170^\circ C.}$ |
| E1 | 0.4142 | 0.704 | 1.28 | $1.54 \times 10^5$ | $2.75 \times 10^5$ | 1.7858 |
| E2 | 0.2742 | 0.540 | 0.98 | $2.05 \times 10^4$ | $1.55 \times 10^4$ | 0.7541 |
| C1 | 0.4761 | 1.269 | 2.31 | $8.50 \times 10^3$ | $5.91 \times 10^3$ | 0.6947 |

Figure 5:
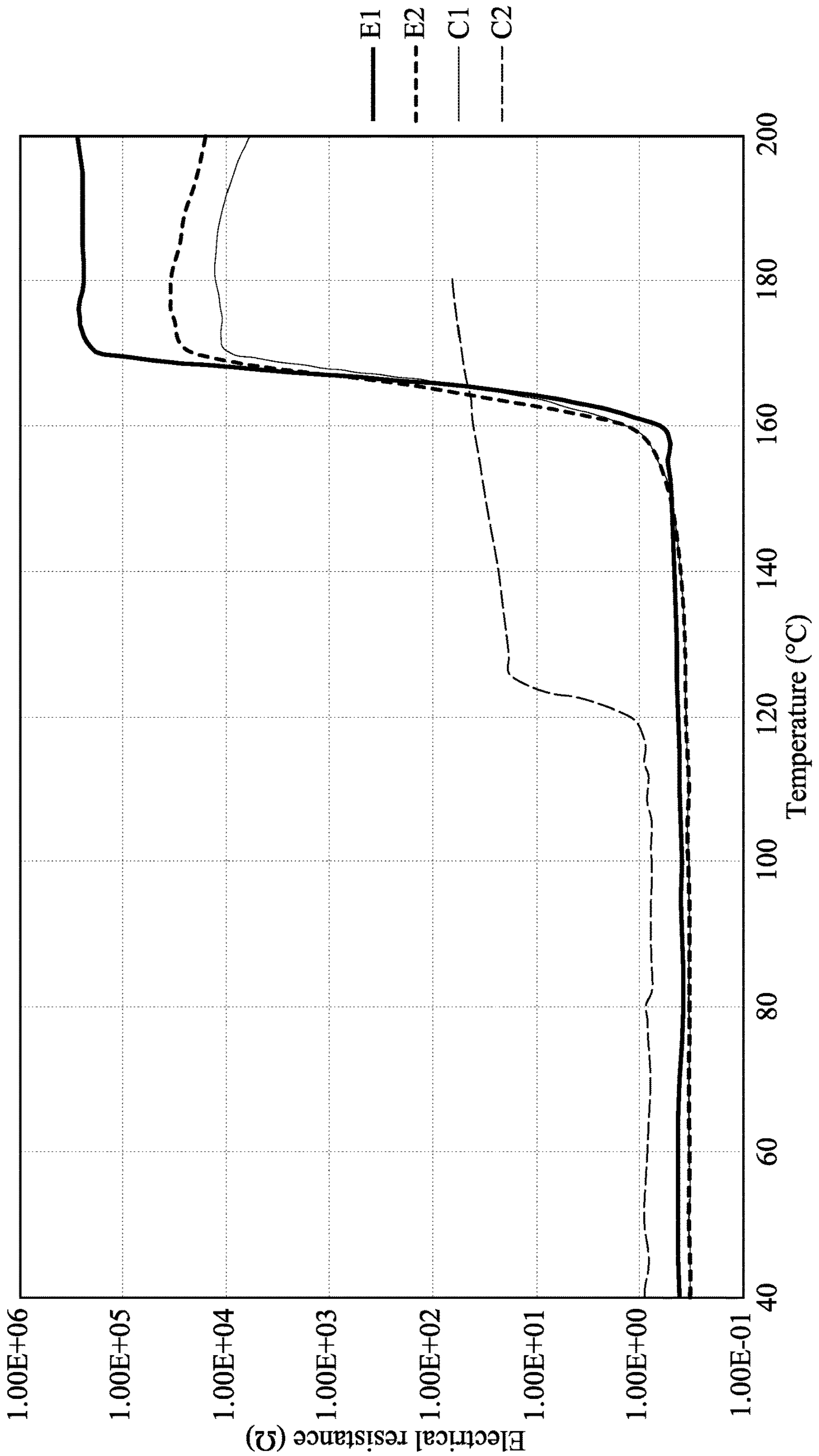
FIG. 5 shows resistance-temperature curves in accordance with the radial-leaded over-current protection device shown in FIG. 3.

Please refer to FIG. 5 and Table 6. As the heating condition described above, the electrical resistance corresponding to a given temperature can measured, and the resistance-temperature curves can be illustrated in FIG. 5. In Table 6, the first row shows items to be tested from left to right.

"$R_i$" refers to initial electrical resistance of the PTC chip at room temperature.

"$R_{RLD}$" refers to electrical resistance of the RLD device at room temperature.

"$R_{170^\circ C.}$" refers to electrical resistance of the RLD device at 170° C.

"$R_{200^\circ C.}$" refers to electrical resistance of the RLD device at 200° C.

"$R_{200^\circ C.}/R_{170^\circ C.}$" refers to the ratio between the electrical resistance of the RLD device at 200° C. and the electrical resistance of the RLD device at 170° C. The larger the ratio is, the less the NTC behavior will be. It is noted that the discussion in Table 6 focuses on the device for apparatuses requiring high protection temperature, and thus the comparative example C2 with low melting point is not included for discussion (same as in Table 7 below).

When the PTC chip is processed to form the RLD device, high temperature from the reflow soldering process causes trip of device. Therefore, after cooling back to room temperature, the electrical resistance of the RLD device would be different from the initial electrical resistance $R_i$. In the embodiments E1-E2, $R_{RLD}$ ranges from 0.540Ω to 0.704Ω, and the comparative example C1 is 1.269Ω. After the production process of the RLD device, $R_{RLD}$ of the comparative example C1 is much higher at room temperature, and is about 2.7 times the initial electrical resistance $R_i$. In other words, the embodiments E1-E2 exhibit excellent thermal stability of the electrical resistance during the process of producing the RLD device from the PTC chip.

Then, please refer to $R_{170^\circ C.}$, $R_{200^\circ C.}$, and $R_{200^\circ C.}/R_{170^\circ C.}$. According to the property of the polymer matrix, the RLD device trips at the temperature from about 170° C. to 180° C., and its electrical resistance jumps to the highest point in the meantime. Along with gradual increase in temperature to 200° C., the electrical resistance varies based on the composition of the RLD device. In the embodiments E1-E2, either $R_{170^\circ C.}$ or $R_{200^\circ C.}$ is much higher than that of the comparative example C1. The embodiments E1-E2 have better capability for cutting off the overcurrent when tripping. As for $R_{200^\circ C.}/R_{170^\circ C.}$, the embodiments E1-E2 keep the ratio in the range from 0.7541 to 1.7858, which is higher than that of 0.6947 in the comparative example C1. Particularly, $R_{200^\circ C.}/R_{170^\circ C.}$ of the embodiment E1 is much higher than 1, and it means that the electrical resistance of the RLD device does not decrease followed by the continuous high-temperature and no NTC behavior is observed. In this way, the RLD device can keep cutoff of the overcurrent under the continuous high temperature condition.

From the above, PVDF with high melt viscosity in the resistance-temperature test has at least two advantages: first, the electrical resistance jumps to a higher value when tripping; and second, NTC behavior is less pronounced after tripping.

At last, voltage endurance capability of the present invention is also verified, as shown in the cycle life test of Table 7 below.

TABLE 7

| Cycle life test. | | |
|---|---|---|
| Group | 36 V/20 A_500 cycles | 36 V/20 A_1000 cycles |
| E1 | Pass | Pass |
| E2 | Pass | Fail |
| C1 | Fail | Fail |

One cycle of the cycle life test includes applying voltage/current at 36V/20 A for 10 seconds and turning it off for 60 seconds (i.e., on: 10 seconds; off: 60 seconds). It is observed whether the over-current protection device is burnt out after 500 or 1000 cycles. "Pass" means that the over-current protection device is not burnt out, and "Fail" means that the over-current protection device is burnt out.

Regarding 500 cycles of the cycle life test, both the embodiment E1 and the embodiment E2 are capable of withstanding the applied voltage/current at 36V/20 A (repeated 500 times), and the comparative example C1 is not. In other case, the number of cycle is increased to 1000, and the embodiment E1 can still withstand such voltage/current and is not burnt out. According to the result of the embodiments E1-E2, it is well observed that voltage endurance capability of the over-current protection device can be significantly improved if the melt viscosity is in the specific range (3000 Pa·s-5300 Pa·s); and its voltage endurance capability becomes better along with the increase in melt viscosity in that range. In conclusion, the embodiments E1-E2 have excellent stability in electrical resistance, and can withstand more cycles in the cycle life test without burnout.

The above-described embodiments of the present invention are intended to be illustrative only. Numerous alternative embodiments may be devised by persons skilled in the art without departing from the scope of the following claims.

What is claimed is:

1. An over-current protection device, comprising:

a first electrode layer;

a second electrode layer; and a positive temperature coefficient (PTC) material layer laminated between the first electrode layer and the second electrode layer, the PTC material layer comprising:

a polymer matrix comprising a first fluoropolymer, wherein the total volume of the PTC material layer is calculated as 100%, and the first fluoropolymer accounts for 47% to 62% by volume of the PTC material layer, and the first fluoropolymer has a melt viscosity ranging from 3000 Pa·s to 5300 Pa·s at 240° C. and at a shear rate of 50 $sec^{-1}$, wherein the first fluoropolymer is selected from the group consisting of a first polyvinylidene difluoride (PVDF), a second PVDF, and a combination thereof, wherein the first PVDF has a first melt viscosity and the second PVDF has a second melt viscosity, and the second melt viscosity is higher than the first melt viscosity; and a conductive filler dispersed in the polymer matrix, thereby forming an electrically conductive path in the PTC material layer.

2. The over-current protection device of claim 1, wherein the first melt viscosity ranges from 3000 Pa·s to 3600 Pa·s, and the second melt viscosity ranges from 4700 Pa·s to 5300 Pa·s.

3. The over-current protection device of claim 1, wherein the polymer matrix further comprises a second fluoropolymer selected from the group consisting of polytetrafluoroethylene (PTFE), ethylene-tetrafluoroethylene copolymer, tetrafluoroethylene-hexafluoro-propylene copolymer, perfluoroalkoxy modified tetrafluoroethylenes, poly(chlorotrifluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof.

4. The over-current protection device of claim 3, wherein the second fluoropolymer is PTFE, wherein the total volume of the PTC material layer is calculated as 100%, and PTFE accounts for 4.0% to 4.9% by volume of the PTC material layer.

5. The over-current protection device of claim 4, wherein the PTC material layer does not comprise a plasticizer and a cross-linking agent.

6. The over-current protection device of claim 5, wherein the conductive filler is carbon black.

7. The over-current protection device of claim 6, wherein the polymer matrix consists of PVDF and PTFE, wherein the volume of the polymer matrix is calculated as 100%, and PVDF accounts for 91% to 94% and PTFE accounts for 6% to 9% by volume of the polymer matrix.

8. The over-current protection device of claim 1, wherein the first fluoropolymer has a melt flow index ranging from 0.5 g/10 min to 4.3 g/10 min at 230° C.

9. The over-current protection device of claim 1, wherein a mixture is formed of the polymer matrix and the conductive filler during a blending operation, and the mixture has a blending viscosity so that a blender performs the blending operation with a torque ranging from 27 N·m to 29 N·m.

10. The over-current protection device of claim 1, wherein the over-current protection device has a first electrical resistance when cooled back to room temperature after a first trip event, and the over-current protection device has a second electrical resistance when cooled back to room temperature after a second trip event, wherein a value by dividing the second electrical resistance by the first electrical resistance ranges from 0.9 to 1.3.

11. The over-current protection device of claim 10, wherein the over-current protection device has the second electrical resistance when cooled back to room temperature after baking at 175° C. for 4 hours, and the value ranges from 0.99 to 1.17.

12. The over-current protection device of claim 10, wherein the over-current protection device has the second electrical resistance when cooled back to room temperature after baking at 175° C. for 10 hours, and the value ranges from 0.90 to 1.20.

13. The over-current protection device of claim 1, wherein the over-current protection device has a third electrical resistance at 170° C., and has a fourth electrical resistance at 200° C., wherein a value by dividing the fourth electrical resistance by the third electrical resistance ranges from 0.75 to 1.79.

* * * * *